US012808532B1

(12) United States Patent
Wang

(10) Patent No.: US 12,808,532 B1
(45) Date of Patent: Nov. 24, 2026

(54) SEALED AND WATERPROOF PLUG-IN LIGHT-EMITTING DIODE (LED) LIGHT STRING STRUCTURE

(71) Applicant: Dongguan Huanhui Technology Co., Ltd., Dongguan City (CN)

(72) Inventor: Wei Wang, Dongguan City (CN)

(73) Assignee: Dongguan Huanhui Technology Co., Ltd., Dongguan City (CN)

( * ) Notice: Subject to any disclaimer, the term of this patent is extended or adjusted under 35 U.S.C. 154(b) by 0 days.

(21) Appl. No.: 19/542,161

(22) Filed: Feb. 17, 2026

(30) Foreign Application Priority Data

Dec. 22, 2025 (CN) ........................ 202522716526.6

(51) Int. Cl.
*F21K 9/90* (2016.01)
*F21S 4/10* (2016.01)
*F21V 31/00* (2006.01)

(52) U.S. Cl.
CPC ............. *F21V 31/005* (2013.01); *F21S 4/10* (2016.01)

(58) Field of Classification Search
CPC ................................ F21V 31/005; F21S 4/10
See application file for complete search history.

(56) References Cited

U.S. PATENT DOCUMENTS

2023/0047982 A1* 2/2023 Wu .......................... F21S 4/10
2024/0384842 A1* 11/2024 Zou .......................... F21V 3/02

* cited by examiner

*Primary Examiner* — Elmito Breval
(74) *Attorney, Agent, or Firm* — AVEK IP, LLC

(57) ABSTRACT

Some embodiments of the disclosure provide a sealed and waterproof plug-in light-emitting diode (LED) light string structure. In some examples, the sealed and waterproof plug-in LED light string structure includes a series-connected wire. The series-connected wire is connected to a plurality of lamp holders. In other examples, by dispensing an adhesive into an annular sealing groove or placing a special-shaped sealing ring, and then pressing the special-shaped sealing ring with an end cover, wiring ends of the lamp holders are sealed, after bulbs are mounted on the lamp holders, inner cavities of the lamp holders may be sealed, such that the lamp holders are fully enclosed, with a good waterproof effect. The bulbs or light-emitting units may be replaced independently, such that the manufacturing and usage costs are low.

11 Claims, 10 Drawing Sheets

SEALED AND WATERPROOF PLUG-IN LIGHT-EMITTING DIODE (LED) LIGHT STRING STRUCTURE

CROSS REFERENCE TO RELATED APPLICATION

This application claims priority to Chinese patent application number 2025227165266, filed on Dec. 22, 2025, the disclosure of which is incorporated by reference herein in its entirety.

FIELD OF THE DISCLOSURE

The disclosure relates to the technical field of luminaires and discloses a sealed and waterproof plug-in light-emitting diode (LED) light string structure.

BACKGROUND

With the popularization of electric power, luminaires have entered thousands of households. People are no longer confined to using luminaires for general illumination but are more inclined to employ them to create diverse atmospheres. For example, luminaires with different light-emitting colors are formed into light strings, which are then fixed in places such as artificial trees, wall edges, fences, and ceiling tops. However, lamp holders of existing light strings, such as a lamp holder structure disclosed in Chinese Patent No. CN202011227378.7, are poor in waterproof effect. In this prior art, a waterproof and sealed encapsulation layer is formed by applying a coating process to the entire exterior of the lamp holder. However, this waterproof and sealed encapsulation layer can only solve the problem of water ingress at the wire end of the lamp holder, and there will still be a probability of water ingress at the bulb mounting end. Moreover, this fully enclosed structure not only increase the volume of the lamp holder, but also requires a large quantity of encapsulation material, resulting in a higher cost. Furthermore, in this prior art, it is necessary to assemble a bulb equipped with a metal lamp base before the bulb can be powered on and emit light. If any individual component of the bulb is damaged, the entire bulb shall be replaced, which greatly increases the usage cost.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provide a sealed and waterproof plug-in LED light string structure provided by the disclosure includes a series-connected wire, one end of the series-connected wire being connected to a plug and the other end thereof being connected to a socket, where the series-connected wire is connected to a plurality of sealed and waterproof lamp holders, and each of the lamp holders is provided with an LED light-emitting unit and a bulb shell;

the plurality of lamp holders are spaced apart and located between the plug and the socket;

each of the lamp holders is provided with a lamp holder body, where the lamp holder body is provided with an accommodating cavity and an annular sealing groove, the lamp holder body is provided with a linear groove intersecting with the annular sealing groove, the annular sealing groove is filled with a first sealing member, and the series-connected wire passes through the linear groove and is located above the first sealing member;

each of the lamp holders is further provided with an end cover, and the end cover is snap-fitted to the lamp holder body and applies pressure to the series-connected wire, thereby maintaining the formation of an end seal at the linear groove; and an intermediate member is disposed in the accommodating cavity, the intermediate member is provided with a first snap-fit position and a second snap-fit position, the first snap-fit position is provided with a first electrical connecting piece, and the second snap-fit position is provided with a second electrical connecting piece;

the LED light-emitting unit is capable of being plugged into the intermediate member and is electrically connected to the first electrical connecting piece and the second electrical connecting piece; and a second sealing member is further disposed between each of the lamp holders and the bulb shell, and the bulb shell is threadedly connected to each of the lamp holders and applies pressure to the second sealing member, thereby forming sealing.

In some embodiments, the annular sealing groove includes a first curved segment, a first concave segment, a second curved segment and a second concave segment connected in sequence, and the first concave segment and the second concave segment correspond to the linear groove.

Optionally, the annular sealing groove includes a first curved segment, a first concave segment, a second curved segment and a second concave segment connected in sequence, the first concave segment and the second concave segment correspond to the linear groove, and when located in the linear groove, a surface of the series-connected wire is at least flush with the first curved segment or extends beyond an upper surface of the first curved segment.

In some other embodiments, the annular sealing groove is filled with a surface sealing member, and the series-connected wire is located between the first sealing member and the surface sealing member.

Optionally, each of the lamp holders is provided with a waterproof groove, and the second sealing member is snap-fitted and secured in the waterproof groove.

In some embodiments, the bulb shell is provided with a first connecting portion, the first connecting portion is provided with a snap-fit ring, and the second sealing member is disposed at the snap-fit ring.

Optionally, a second connecting portion is disposed on an inner wall of the accommodating cavity, and a flared portion is disposed at an open end of the accommodating cavity.

In some other embodiments, the intermediate member is provided with a plug-in port; the light-emitting unit includes an electrical connection plate capable of being plugged into the plug-in port, a protruding electronic component disposed on the electrical connection plate and an LED light bar connected to the electrical connection plate via an electrical wire; and the plug-in port is provided with a positioning groove adapted to the electronic component to form a fool-proof structure.

Optionally, a pointed protrusion that penetrates into the linear groove is disposed at a tail end of each of the first electrical connecting piece and the second electrical connecting piece, the two pointed protrusions are staggered with each other, and a U-shaped connecting portion is disposed at the other tail end of each of the first electrical connecting piece and the second electrical connecting piece.

In some embodiments, the end cover includes a cover plate, a pin and a wire-pressing rib, the pin is inserted into and fixed to the lamp holder body, the cover plate abuts against the first sealing member, and the wire-pressing rib abuts against the series-connected wire in the linear groove.

Optionally, the first sealing member is formed by dispensing an adhesive or is a special-shaped sealing ring, and the first sealing member protrudes beyond the annular sealing groove so as to cooperate with the end cover to form sealing.

Optionally, the first electrical connecting piece, the second electrical connecting piece and the lamp holder body are integrally formed via an insert member.

Figure 1:
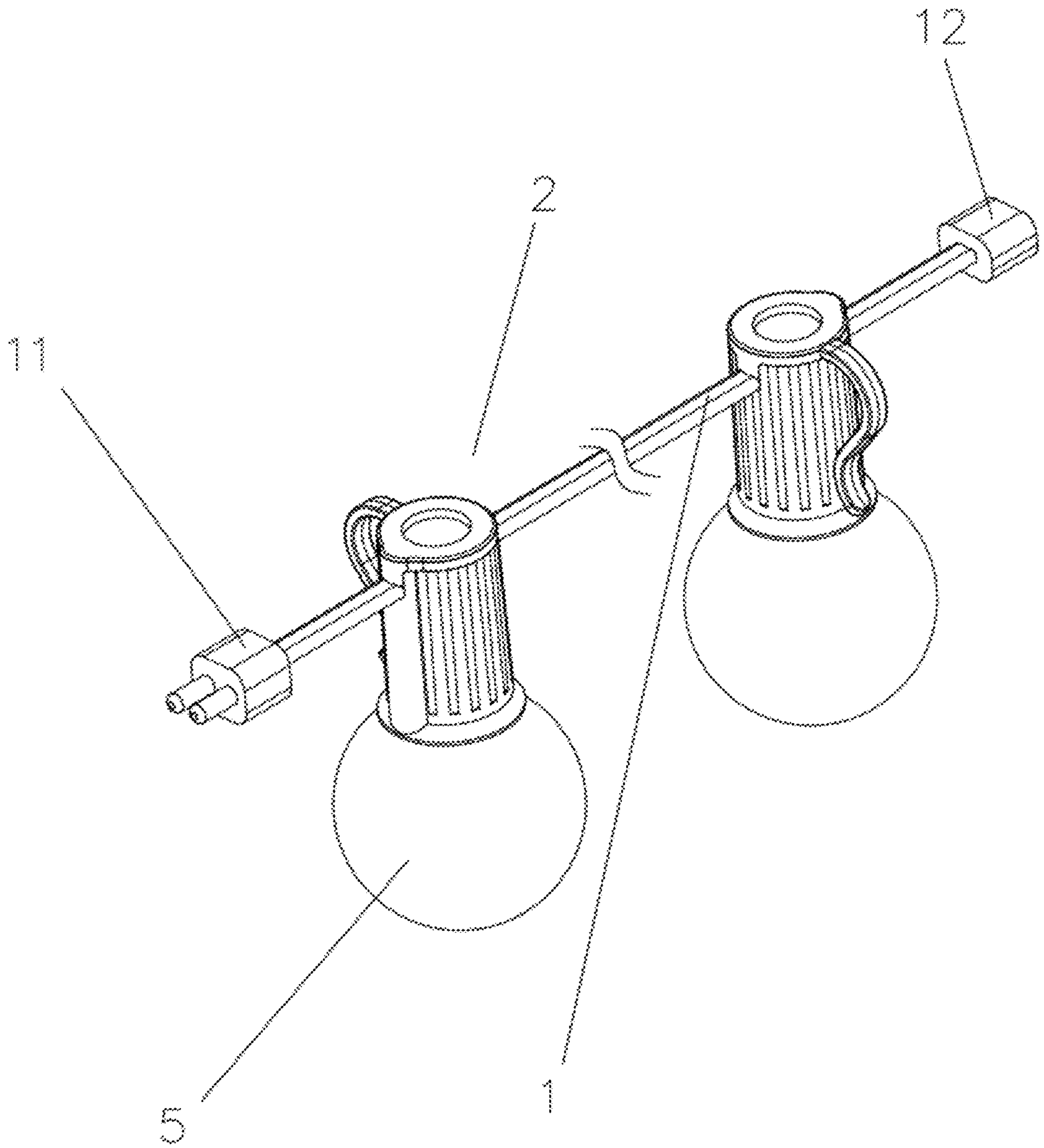
FIG. 1 shows a partial schematic structural diagram of a light string according to an embodiment of the disclosure.
Figure 2:
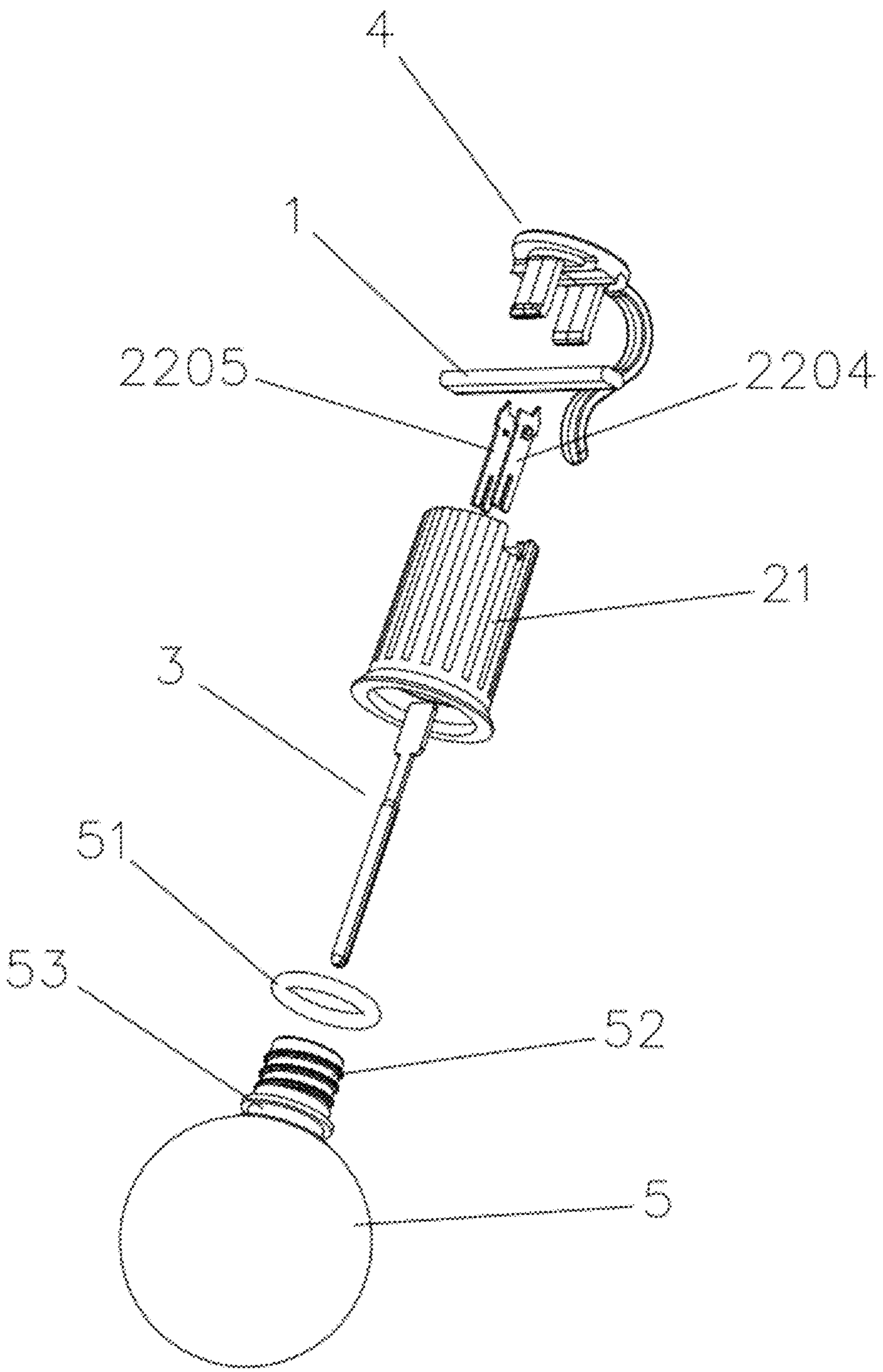
FIG. 2 shows an exploded schematic structural diagram of a lamp holder and an LED light-emitting unit according to an embodiment of the disclosure.
Figure 3:
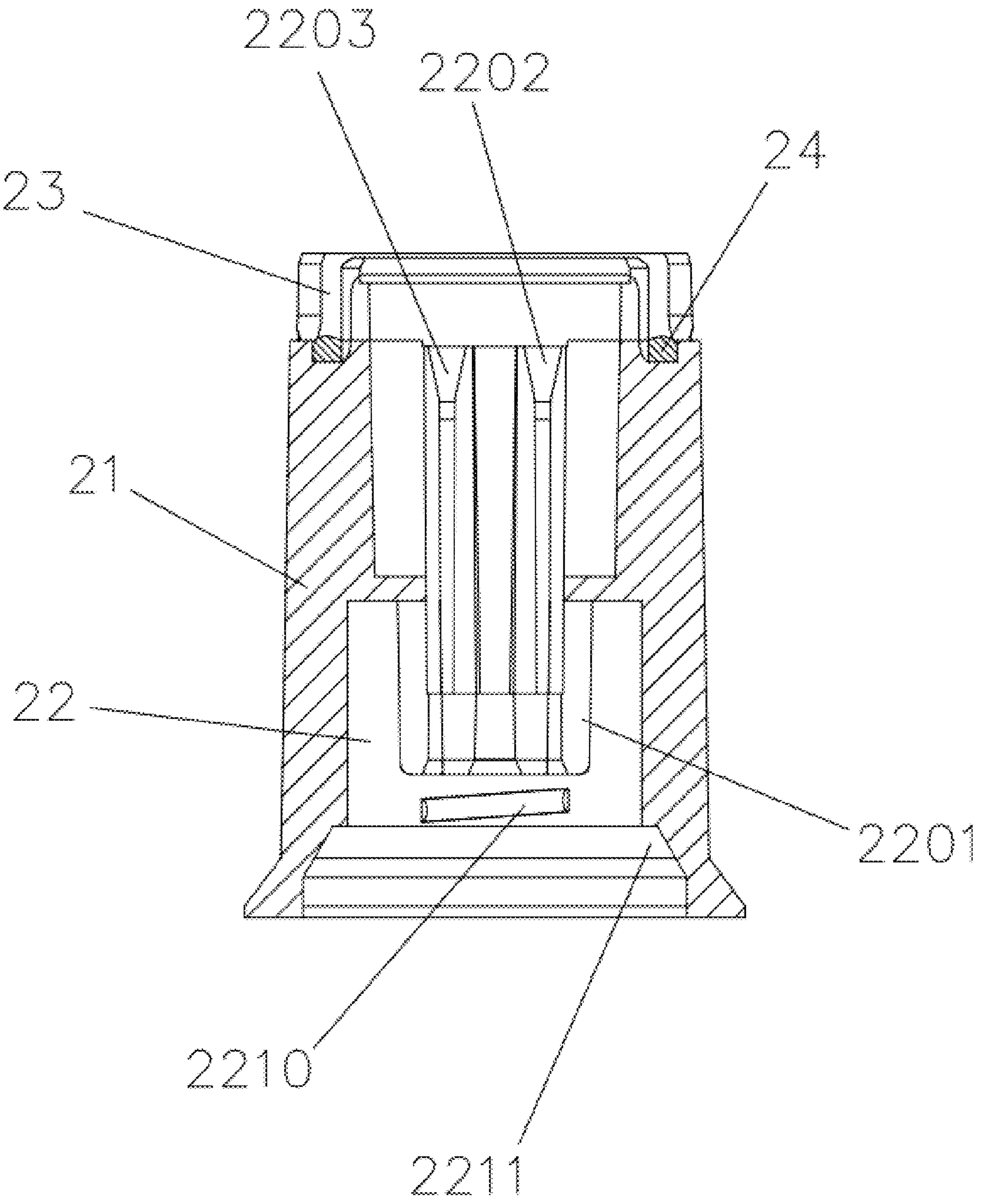
FIG. 3 shows a sectional schematic diagram of a lamp holder body according to an embodiment of the disclosure.
Figure 4:
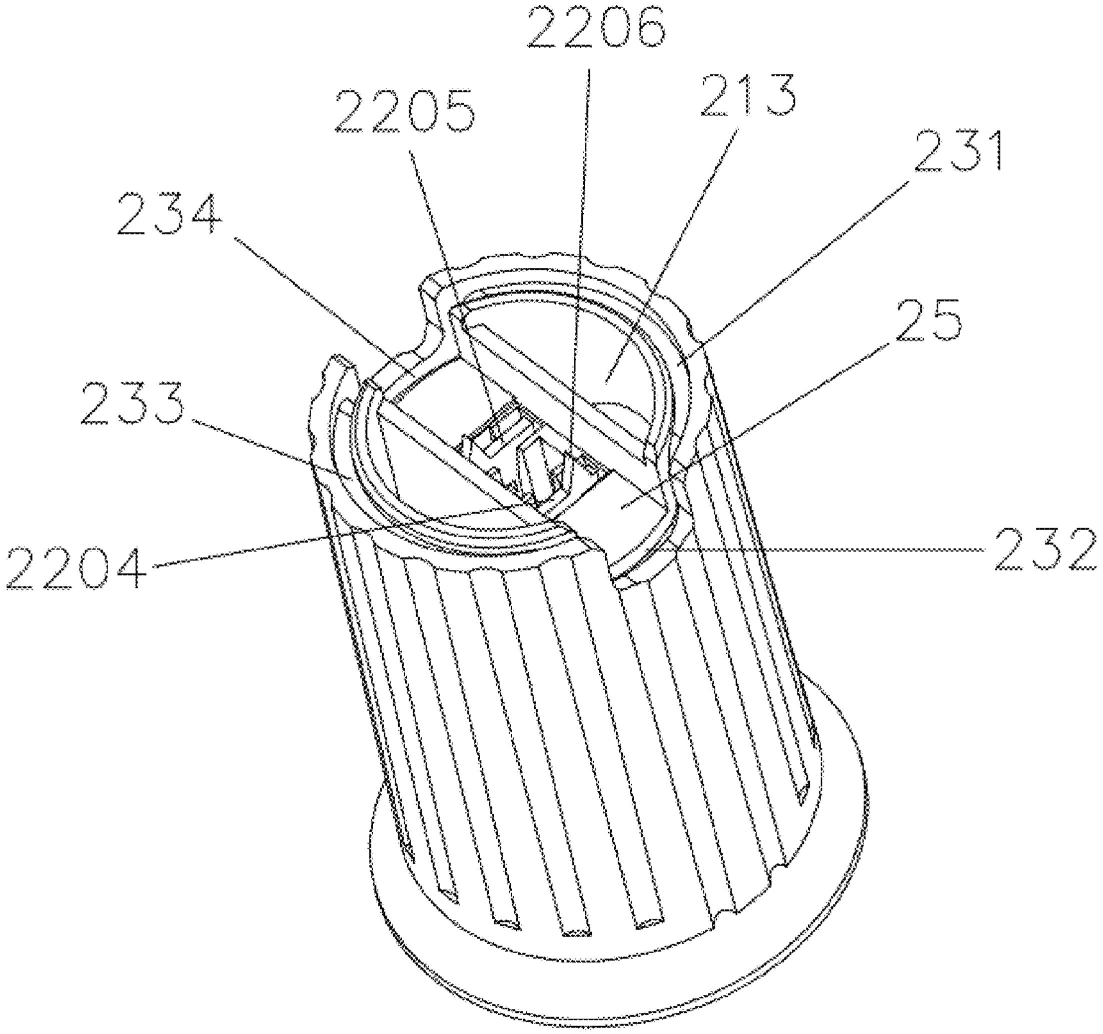
FIG. 4 shows a schematic structural diagram of an end of a lamp holder body according to an embodiment of the disclosure.
Figure 5:
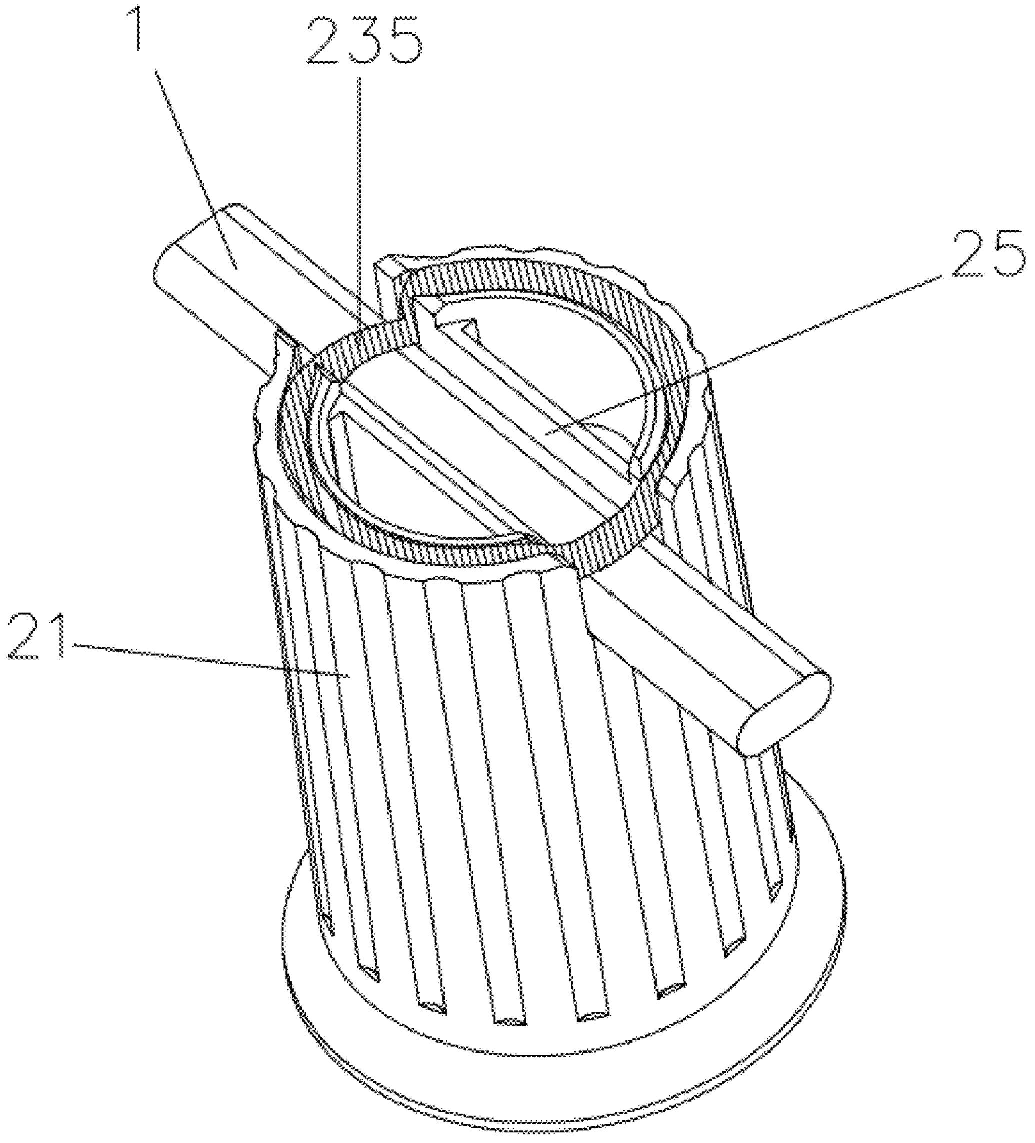
FIG. 5 shows a connection schematic diagram of a series-connected wire and a linear groove according to an embodiment of the disclosure.
Figure 6:
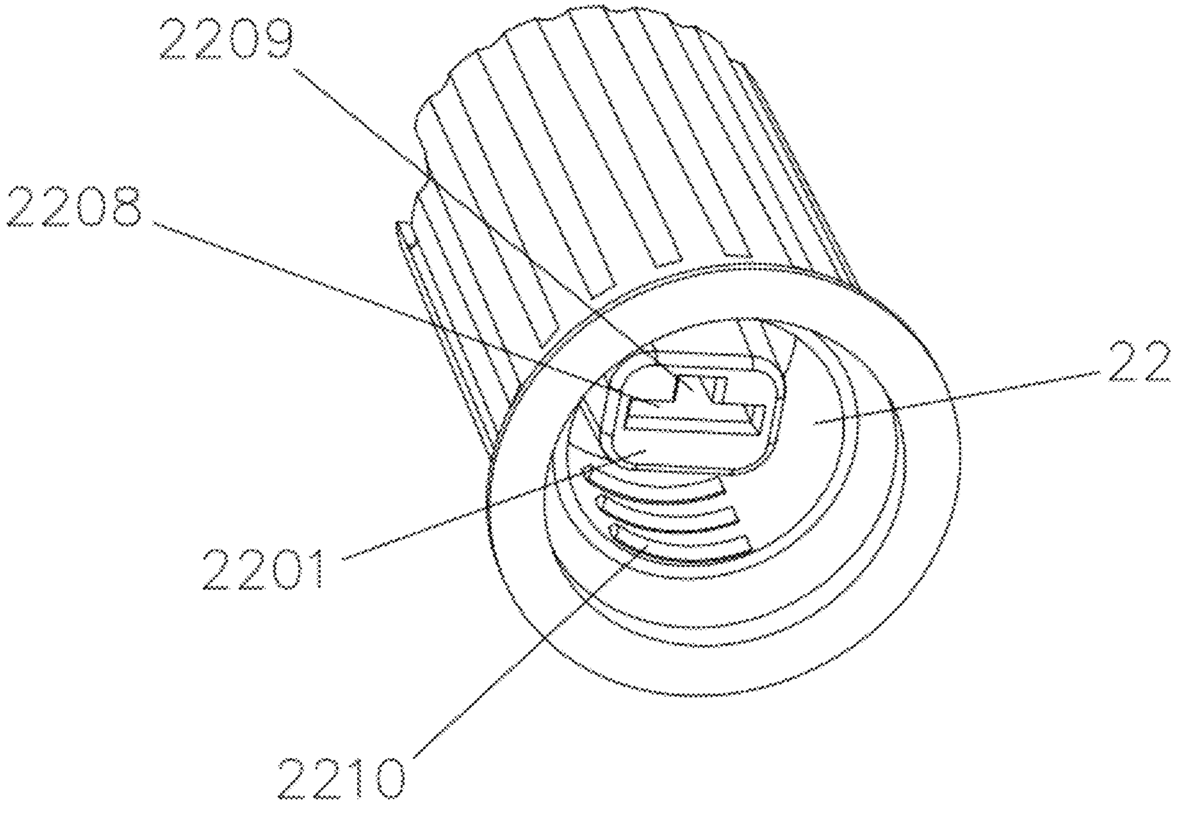
FIG. 6 shows a perspective schematic diagram of an internal structure of an accommodating cavity according to an embodiment of the disclosure.
Figure 7:
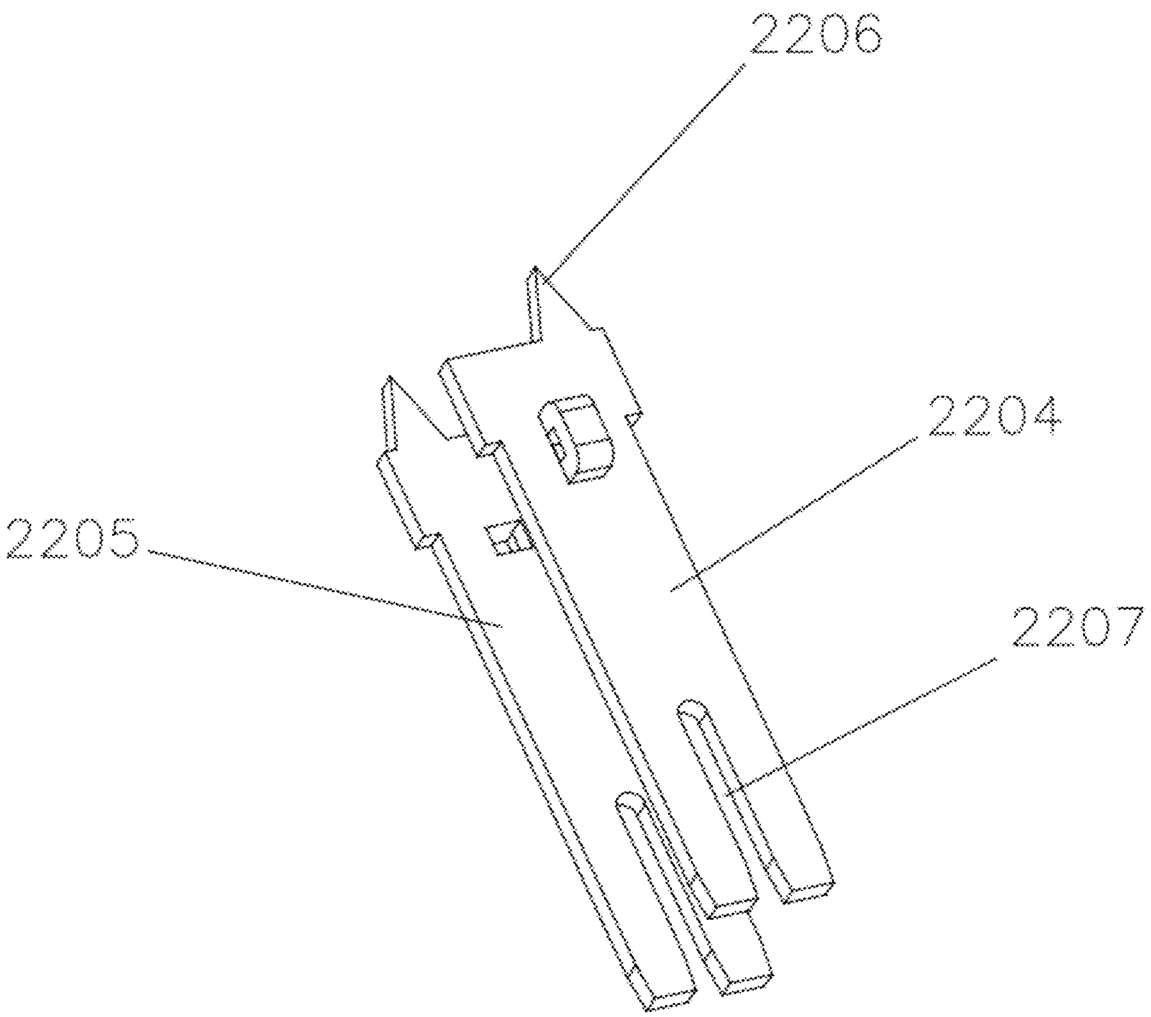
FIG. 7 shows a schematic structural diagram of a first electrical connecting piece and a second electrical connecting piece according to an embodiment of the disclosure.

Reference numerals: 1, series-connected wire; 11, plug; 12, socket; 2, lamp holder; 211, waterproof groove; 212, reverse buckling portion; 213, bayonet; 22, accommodating cavity; 2201, intermediate member; 2202, first snap-fit position; 2203, second snap-fit position; 2204, first electrical connecting piece; 2205, second electrical connecting piece; 2206, pointed protrusion; 2207, U-shaped connecting portion; 2208, plug-in port; 2209, positioning groove; 2210, second connecting portion; 2211, flared portion; 23, annular sealing groove; 231, first curved segment; 251, first concave segment; 232, second curved segment; 252, second concave segment; 253, surface sealing member; 24, first sealing member; 25, linear groove; 3, LED light-emitting unit; 31, electrical connection plate; 32, electronic component; 33, LED light bar; 4, end cover; 41, cover plate; 42, pin; 43, wire-pressing rib; 44, reverse hook; 45, hanging lug; 5, bulb shell; 51, second sealing member; 52, first connecting portion; and 53, snap-fit ring.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The disclosure will be described in detail below in conjunction with FIGS. 1-10.

A sealed and waterproof plug-in light-emitting diode (LED) light string structure provided by the disclosure may include a series-connected wire 1, where one end of the series-connected wire 1 is connected to a plug 11 and the other end thereof is connected to a socket 12; the plug 11 is plugged into a power supply device to electrify the series-connected wire 1, and a plurality of series-connected wires 1 may be connected in series as the plug 11 is plugged into a socket 12 of another series-connected wire 1 via the plug 11; the series-connected wire 1 is connected to a plurality of sealed and waterproof lamp holders 2, and each of the lamp holders 2 is provided with an LED light-emitting unit 3 and a bulb shell 5; and the plurality of lamp holders 2 provided with the LED light-emitting units 3 and the bulb shells 5 are connected to the series-connected wire 1 to form a light string structure;

The plurality of lamp holders 2 are spaced apart and located between the plug 11 and the socket 12. Optionally, the plurality of lamp holders 2 are connected in parallel, such that the circuit of the entire light string is more independent, which avoids the situation where the entire light string fails to emit light due to the malfunction of a single lamp holder 2.

Each of the lamp holders 2 is provided with a lamp holder body 21, where the lamp holder body 21 is provided with an accommodating cavity 22 and an annular sealing groove 23, the lamp holder body 21 is provided with a linear groove 25 intersecting with the annular sealing groove 23, the annular sealing groove 23 is filled with a first sealing member 24, and the series-connected wire 1 passes through the linear groove 25 and is located above the first sealing member 24. Since the linear groove 25 intersects with the annular groove 23, the first sealing member 24 is filled continuously. A portion of the first sealing member 24 passes through the linear groove 25 after being filled. After the series-connected wire 1 is placed into the linear groove 25, an end surface of the series-connected wire 1 abuts against the first sealing member 24, such that both ports of the linear groove 25 achieve sealing between the inner side and the outer side.

As an embodiment of the annular groove 23, the annular sealing groove 23 may include a first curved segment 231, a first concave segment 251, a second curved segment 232 and a second concave segment 252 connected in sequence, and the first concave segment 251 and the second concave segment 252 correspond to the linear groove 25. In this solution, the annular groove 23 is of a special-shaped structure with height differences. The first curved segment 231 and the second curved segment 232 are located at the top end of the lamp holder body 21, the first concave segment 251 and the second concave segment 252 are U-shaped, bottom grooves of the first concave segment 251 and the second concave segment 252 correspond to the bottom of the linear groove 25, two side grooves of the first concave segment 251 and the second concave segment 252 correspond to two side walls of the linear groove 25, and after the annular sealing groove 23 is filled with the first sealing member 24 and the series-connected wire 1 is placed into the annular sealing groove, the series-connected wire 1 abuts against the first sealing member 24 filling the first concave segment 251 and the second concave segment 252, such that the bottom and two sides of both ports of the linear groove 25 are sealed.

Each of the lamp holders 2 is further provided with an end cover 4, and the end cover 4 is snap-fitted to the lamp holder body 21 and applies pressure to the series-connected wire 1, thereby maintaining the formation of an end seal at the linear groove 25. After the series-connected wire 1 is placed into the linear groove 25, the end cover 4 is assembled to the lamp holder body 21. By applying a pressure via the end cover 4 and enclosing both ports of the linear groove 25 via the first sealing member 24, the linear groove 25 is fully sealed.

Figure 8:
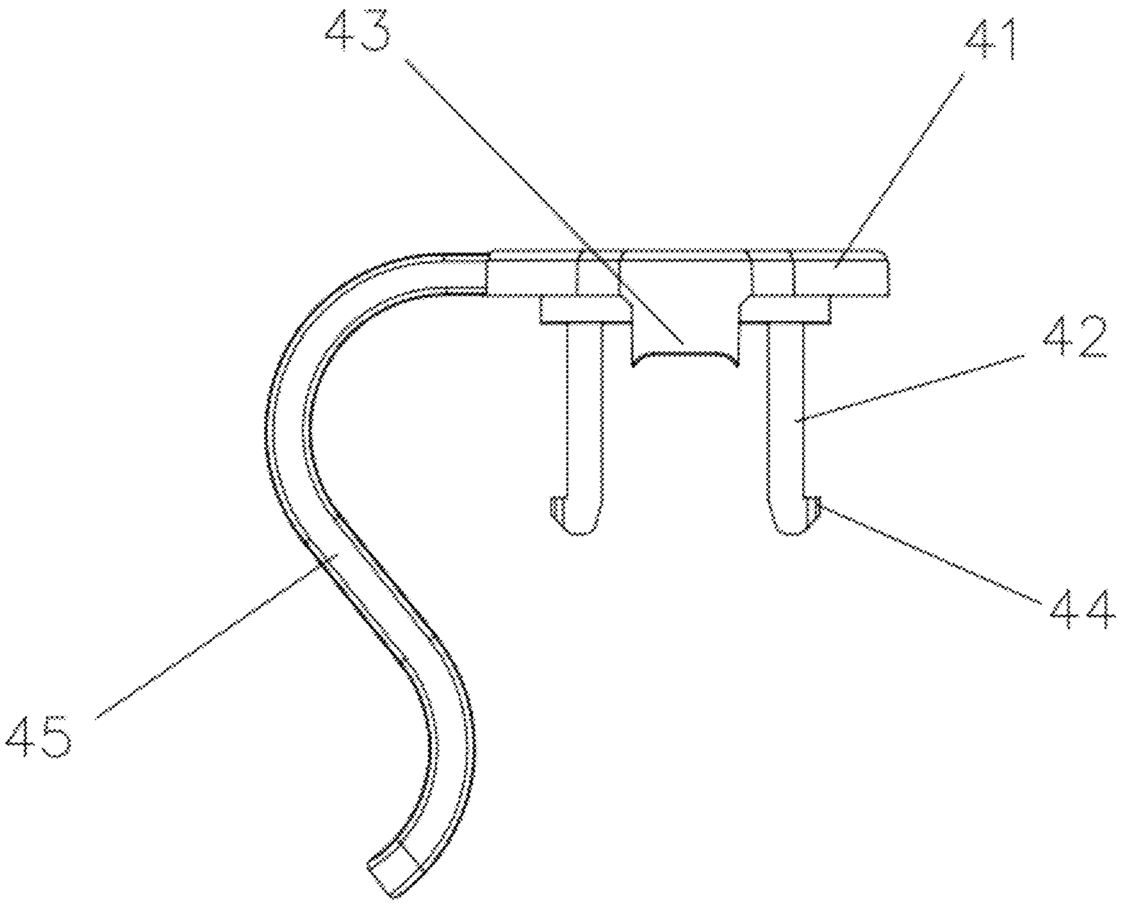
FIG. 8 shows a schematic structural diagram of an end cover according to an embodiment of the disclosure.
Figure 9:
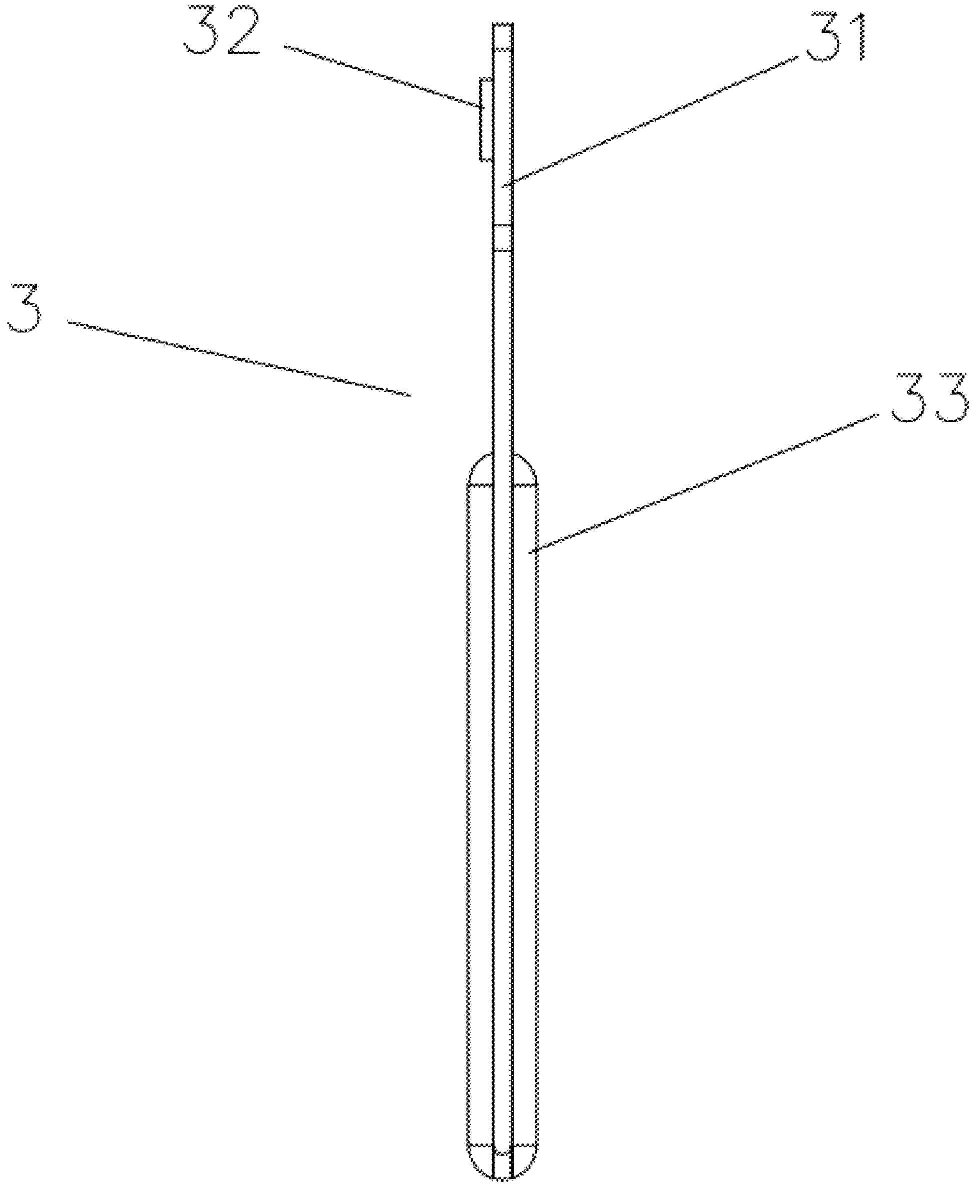
FIG. 9 shows a schematic structural diagram of a light-emitting unit according to an embodiment of the disclosure.
Figure 10:
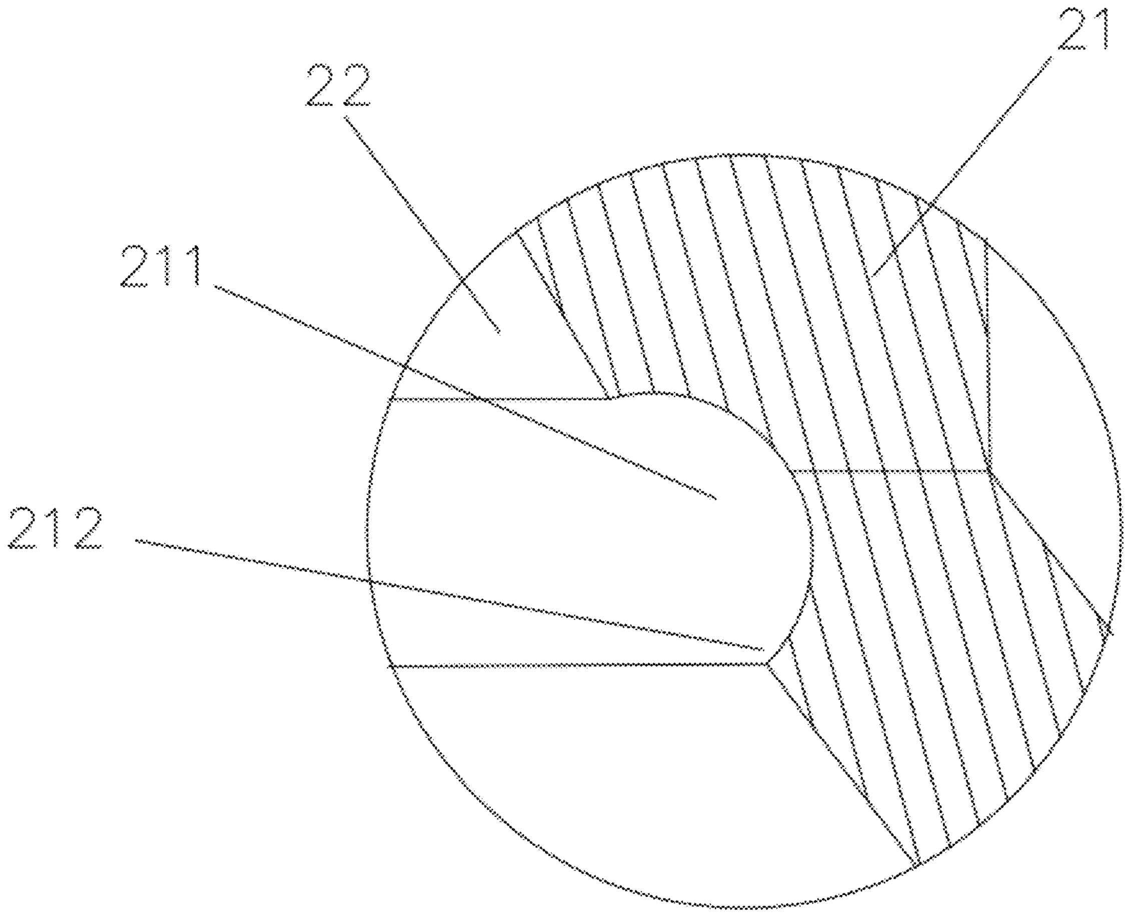
FIG. 10 shows a schematic structural diagram of a waterproof groove according to an embodiment of the disclosure.

Referring to FIG. 8, the end cover 4 may include a cover plate 41, a pin 42 and a wire-pressing rib 43, the pin 42 is inserted into and fixed to the lamp holder body 21, the cover plate 41 abuts against the first sealing member 24, and the wire-pressing rib 43 abuts against the series-connected wire 1 in the linear groove 25. The lamp holder body 21 is provided with a bayonet 213, an end of the pin 42 is provided with a reverse hook 44, after the pin 42 is inserted into the bayonet 213, the reverse hook 44 engages the end surface on the other side of the bayonet 213 to achieve a limiting effect, such that the end cover 4 is connected and fixed to the lamp holder body 21. The wire-pressing rib 43 and the linear groove 25 correspond in width. Edges of two sides of an end surface of the wire-pressing rib 43 that applies pressure to the series-connected wire 1 are provided with protruding structures. After the end cover 4 is mounted, the wire-pressing rib 43 applies pressure to the series-connected wire 1 continuously, and the wire-pressing rib 43 further abuts against the first sealing member 24, such that both ports of the linear groove 25 are fully sealed.

As another embodiment of the annular sealing groove 23, the annular sealing groove 23 may include a first curved segment 231, a first concave segment 251, a second curved segment 232 and a second concave segment 252 connected in sequence, the first concave segment 251 and the second concave segment 252 correspond to the linear groove 25, and when located in the linear groove 25, a surface of the series-connected wire 1 is at least flush with the first curved segment 231 or extends beyond an upper surface of the first curved segment 231. The annular groove 23 is of a special-shaped structure with height differences. The first curved segment 231 and the first concave segment 232 are located at the top end of the lamp holder body 21, the first concave segment 251 and the second concave segment 252 are U-shaped, bottom grooves of the first concave segment 251 and the second concave segment 252 correspond to the bottom of the linear groove 25, two side grooves of the first concave segment 251 and the second concave segment 252 correspond to two side walls of the linear groove 25, and after the annular sealing groove 23 is filled with the first sealing member 24 and the series-connected wire 1 is placed into the annular sealing groove, the series-connected wire 1 abuts against the first sealing member 24 filling the first concave segment 251 and the second concave segment 252, such that the bottom and two sides of both ports of the linear groove 25 are sealed. The diameter of the cover plate 41 is greater than the diameter of the annular sealing groove 23. After the end cover 4 is assembled, the cover plate 41 abuts against the first sealing member 24 filling the first curved segment 231 and the second curved segment 232, such that the top of the lamp holder body 21 is enclosed to prevent rainwater or water vapor from entering the interior of the linear groove 25 or the lamp holder body 21 from the gap where the end cover 4 is connected to the lamp holder body 21.

An intermediate member 2201 is disposed in the accommodating cavity 22, and the intermediate member is disposed at the central position of the accommodating cavity 22. The intermediate member 2201 is provided with a first snap-fit position 2202 and a second snap-fit position 2203, the first snap-fit position 2202 is provided with a first electrical connecting piece 2204, and the second snap-fit position 2203 is provided with a second electrical connecting piece 2205. The first electrical connecting piece 2204 and the second electrical connecting piece 2205 are connected to the series-connected wire 1 via electrical wires to electrify the lamp holders 2.

The LED light-emitting unit 3 may be plugged into the intermediate member 2201 and is electrically connected to the first electrical connecting piece 2204 and the second electrical connecting piece 2205. The first electrical connecting piece 2204 and the second electrical connecting piece 2205 are connected to the series-connected wire 1 via the electrical wire, such that the LED light-emitting unit 3 emits light. In this solution, the light-emitting unit 3 is an independent part, which may be independently detached and replaced and directly plugged into the intermediate member 2201. Compared with a conventional metal lamp base with an independent bulb screw-mounted on the lamp holder 2, the LED light-emitting unit 3 and the bulb shell 5 may both be independently disassembled and assembled, such that the mounting speed is high, and the cost is also lower than that of the entire bulb.

A second sealing member 51 is further disposed between each of the lamp holders 2 and the bulb shell 5, and the bulb shell 5 is threadedly connected to each of the lamp holders 2 and applies pressure to the second sealing member 51, thereby forming sealing. The light-emitting unit 3 and the bulb shell 5 may be independently detached, facilitating random replacement by a user, and the usage cost is low. After the bulb shell 5 is mounted, the bulb shell 5 and the lamp holder body 21 mutually apply pressures to the second sealing member 51 to form sealing. Under the action of the first sealing member 24 and the second sealing member 51, the lamp holders 2 are fully sealed to perfectly prevent rainwater and water vapor from penetrating into the interiors of the lamp holders 2, with a good waterproof effect.

As an embodiment where the second sealing member 51 is mounted, each of the lamp holders 2 is provided with a waterproof groove 211, and the second sealing member 51 is snap-fitted and secured in the waterproof groove 211. The waterproof groove 211 is formed near an open end of the accommodating cavity 22, the second sealing member 51 is a sealing rubber ring, the second sealing member 51 is placed in the waterproof groove 211, and after being mounted, the bulb shell 5 abuts against the second sealing member 51, such that the open end of the accommodating cavity 22 is enclosed to seal each of the lamp holders 2. In this embodiment, regardless of the shape variation of the bulb shell 5, the bulb shell 5 abuts the second sealing member 51 after being mounted to achieve sealing. During use of this light string, usually, the LED light-emitting units 3 have already been mounted. However, in some cases, for example, a certain bulb shell 5 fails, it is necessary to replace the bulb shell 5 at this time. Therefore, to save the replacement cost of the second sealing ring, the waterproof groove 211 is provided with the reverse buckling portion 212, and during assembly, after the second sealing member 51 is mounted in the waterproof groove 211, due to the action of the reverse buckling portion 212, the second sealing member 51 is always confined within the waterproof groove 211 and does not fall off. Experiments show that the function of the reverse buckling portion 212 is beneficial.

As another embodiment of the second sealing member 51, the bulb shell 5 is provided with a first connecting portion 52, the first connecting portion 52 is provided with a snap-fit ring 53, and the second sealing member 51 is disposed at the snap-fit ring 53. In this solution, the second sealing member 51 is a sealing rubber ring, the second sealing member 51 is detachably connected to the bulb shell 5, a front end of the first connecting portion 52 is provided with a thread, the bulb shell 5 is mounted in a screw-rotating manner, during mounting, the bulb shell 5 gradually approaches the lamp holder body 21, such that the second sealing member 51 abuts against the open end of the accommodating cavity 22 finally, and under mutual pressures of the lamp holder body 21 and the bulb shell 5, the second sealing member 51 seals the accommodating cavity 22. In this embodiment, second sealing members 51 with different thicknesses may be used according to the shape of the bulb shell 5 to achieve a perfect sealing effect.

A second connecting portion 2210 is disposed on an inner wall of the accommodating cavity 22, and a flared portion 2211 is disposed at an open end of the accommodating cavity 22. The front end of the first connecting portion 52 is provided with the thread, the second connecting portion 2210 may engage with the first connecting portion 52, the bulb shell 5 is mounted via screw rotation, and during mounting, and the bulb shell 5 gradually approaches the lamp holder body 21, such that the second sealing member 51 abuts against the flared portion 2211 finally to seal the accommodating cavity 22.

The annular sealing groove 23 is filled with a surface sealing member 253, and the series-connected wire 1 is located between the first sealing member 24 and the surface sealing member 253. The surface seal member 253 is formed by dispensing or coating an adhesive. After the series-connected wire 1 is placed into the linear groove 25 and abuts against the first sealing member 24, the adhesive is dispensed or coated along the annular sealing groove 23 to form the surface sealing member 253. After being assembled, the end cover 4 abuts against the surface sealing member 253, such that the end of each of the lamp holders 2 is fully sealed.

The intermediate member 2201 is provided with a plug-in port 2208; the light-emitting unit 3 may include an electrical connection plate 31 capable of being plugged into the plug-in port 2208, a protruding electronic component 32 disposed on the electrical connection plate 31 and an LED light bar 33 connected to the electrical connection plate 31 via an electrical wire; and the plug-in port 2208 is provided with a positioning groove 2209 adapted to the electronic component 32 to form a fool-proof structure. The protruding electronic component 32 is mated with the positioning groove 2209, facilitating the correct insertion and assembly of the light-emitting unit 3. Optionally, the electronic component 32 may be composed of a power resistor protruding from the surface of the electrical connection plate 31 to control the resistor connected to a power supply.

A pointed protrusion 2206 that penetrates into the linear groove 25 is disposed at a tail end of each of the first electrical connecting piece 2204 and the second electrical connecting piece 2205, the two pointed protrusions 2206 are staggered with each other, and a U-shaped connecting portion 2207 is disposed at the other tail end of each of the first electrical connecting piece 2204 and the second electrical connecting piece 2205. The series-connected wire 1 is composed of at least two wires isolated by insulation, and the series-connected wire 1 is mounted behind the linear groove 25. The first pointed protrusion 2206 and the second pointed protrusion 2206 penetrate into different wires, respectively, such that the first electrical connection piece 2204 and the second electrical connection piece 2205 are electrified to generate two electrodes in each of the lamp holders 2, thereby facilitating the electrical connection between the light-emitting unit 3 and the each of the lamp holders 2. The U-shaped connecting portion 2207 extends into the plug-in port 2208 to form a clamping structure, after being inserted into the plug-in port 2208, the electrical connection plate 31 may be connected to the first electrical connecting piece 2204 and the second electrical connecting piece 2205 via an electrical wire, and the U-shaped connecting portion 2207 may further clamp the electrical connection plate 31, such that a light-emitting assembly is fixedly connected relative to the intermediate member 2201 to prevent the light-emitting unit 3 from loosening and falling off.

The first sealing member 24 is formed by dispensing an adhesive or is a special-shaped sealing ring, and the first sealing member 24 protrudes beyond the annular sealing groove 23 so as to cooperate with the end cover 4 to form sealing. The first sealing member 24 may be formed by dispensing a liquid sealant after curing. After the series-connected wire 1 and the end cover 4 are in contact with the first sealing member 24, the drop-shaped first sealing member 24 is fully diffused, such that the first sealing member 24 fully fits the series-connected wire 1 and the end cover 4. In consideration of assembly of the lamp holders 2, the first sealing member 24 may be a special-shaped sealing ring. During assembly of the lamp holders 2, the special-shaped sealing ring may be directly embedded into the annular sealing groove 23 and the series-connected wire 1 and the end cover 4 are quickly mounted, such that the production speed of the product is increased.

The end cover 4 is provided with a hanging lug 45. The hanging lug 45 is a curved strip having a degree of elasticity. After the end cover 4 is mounted on the lamp holder body 21, a portion of the hanging lug 45 abuts against the lamp holder body 21, such that a hanging hole is formed between the hanging lug 45 and the lamp holder body 21, so as to facilitate the hanging of the light string on objects such as ropes and thin rods for use.

The first electrical connecting piece 2204, the second electrical connecting piece 2205 and the lamp holder body 21 are integrally formed via an insert member. During production, the first electrical connecting piece 2204 and the second electrical connecting piece 2205 are placed into a mold of the lamp holder body 21, such that the first electrical connecting piece 2204, the second electrical connecting piece 2205 and the lamp holder body 21 are thermally formed together, with high structural integrity and stability.

The above content is merely a preferred embodiment of the disclosure. For those skilled in the art, modifications may be made to the specific implementation modes and application scope in accordance with the concept of the disclosure. The content of this specification shall not be construed as a limitation on the disclosure.

Various embodiments of the disclosure may have one or more of the following effects. In some embodiments, the sealed and waterproof plug-in LED light string structure provided by the disclosure may include the series-connected wire, where the series-connected wire is connected to the plurality of lamp holders, and each of the lamp holders is provided with the LED light-emitting unit and the bulb shell; each of the lamp holders is provided with the lamp holder body, where the lamp holder body is provided with the accommodating cavity, the annular sealing groove, the linear groove, and the first sealing member; each of the lamp holders is further provided with the end cover; the intermediate member is disposed in the accommodating cavity, and the light-emitting unit is capable of plugged into the intermediate member; the second sealing member is further disposed between each of the lamp holders and the bulb shell. In other embodiments, the disclosure has the following advantages: after the series-connected wire is connected into the linear groove, by dispensing an adhesive into the annular sealing groove or placing the special-shaped sealing ring, and then pressing the special-shaped sealing ring with the end cover, wiring ends of the lamp holders are sealed; after the bulbs are mounted on the lamp holders, inner cavities of the lamp holders may be sealed, such that the lamp holders are fully enclosed to perfectly prevent rainwater and the like from penetrating into the interiors of the lamp holders, with a good waterproof effect; the bulbs or light-emitting units may be replaced independently, such that the manufacturing and usage costs are low. In further embodiments, the disclosure may provide a sealed and waterproof plug-in light-emitting diode (LED) light string structure, which may have the advantages of being sealed, waterproof and low in cost.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A sealed and waterproof plug-in light-emitting diode (LED) light string structure, comprising a series-connected wire (1), wherein:

one end of the series-connected wire (1) is connected to a plug (11) and another end is connected to a socket (12);

the series-connected wire (1) is connected to a plurality of sealed and waterproof lamp holders (2), and each of the lamp holders (2) is provided with an LED light-emitting unit (3) and a bulb shell (5);

the plurality of lamp holders (2) are spaced apart and located between the plug (11) and the socket (12);

each of the lamp holders (2) is provided with a lamp holder body (21), wherein the lamp holder body (21) is provided with an accommodating cavity (22) and an annular sealing groove (23), the lamp holder body (21) is provided with a linear groove (25) intersecting with the annular sealing groove (23), the annular sealing groove (23) is filled with a first sealing member (24), and the series-connected wire (1) passes through the linear groove (25) and is located above the first sealing member (24);

each of the lamp holders (2) is further provided with an end cover (4), and the end cover (4) is snap-fitted to the lamp holder body (21) and applies pressure to the series-connected wire (1), thereby maintaining a formation of an end seal at the linear groove (25);

an intermediate member (2201) is disposed in the accommodating cavity (22), the intermediate member (2201) is provided with a first snap-fit position (2202) and a second snap-fit position (2203), the first snap-fit position (2202) is provided with a first electrical connecting piece (2204), and the second snap-fit position (2203) is provided with a second electrical connecting piece (2205);

the LED light-emitting unit (3) is configured to be plugged into the intermediate member (2201) and is electrically connected to the first electrical connecting piece (2204) and the second electrical connecting piece (2205); and a second sealing member (51) is further disposed between each of the lamp holders (2) and the bulb shell (5), and the bulb shell (5) is threadedly connected to each of the lamp holders (2) and applies pressure to the second sealing member (51).

2. The sealed and waterproof plug-in LED light string structure according to claim 1, wherein:

the annular sealing groove (23) comprises a first curved segment (231), a first concave segment (251), a second curved segment (232), and a second concave segment (252) connected in sequence; and the first concave segment (251) and the second concave segment (252) correspond to the linear groove (25).

3. The sealed and waterproof plug-in LED light string structure according to claim 1, wherein:

the annular sealing groove (23) comprises a first curved segment (231), a first concave segment (251), a second curved segment (232) and a second concave segment (252) connected in sequence;

the first concave segment (251) and the second concave segment (252) correspond to the linear groove (25); and when located in the linear groove (25), a surface of the series-connected wire (1) is at least flush with the first curved segment (231) or extends beyond an upper surface of the first curved segment (231).

4. The sealed and waterproof plug-in LED light string structure according to claim 1, wherein:

the annular sealing groove (23) is filled with a surface sealing member (253); and the series-connected wire (1) is located between the first sealing member (24) and the surface sealing member (253).

5. The sealed and waterproof plug-in LED light string structure according to claim 1, wherein:

each of the lamp holders (2) is provided with a waterproof groove (211); and the second sealing member (51) is snap-fitted and secured in the waterproof groove (211).

6. The sealed and waterproof plug-in LED light string structure according to claim 1, wherein:

the bulb shell (5) is provided with a first connecting portion (52);

the first connecting portion (52) is provided with a snap-fit ring (53); and the second sealing member (51) is disposed at the snap-fit ring (53).

7. The sealed and waterproof plug-in LED light string structure according to claim 1, wherein:

the intermediate member (2201) is provided with a plug-in port (2208);

the light-emitting unit (3) comprises an electrical connection plate (31) configured to be plugged into the plug-in port (2208), a protruding electronic component (32) being disposed on the electrical connection plate (31)

and an LED light bar (33) being connected to the electrical connection plate (31) via an electrical wire; and the plug-in port (2208) is provided with a positioning groove (2209) adapted to the electronic component (32) to form a fool-proof structure.

8. The sealed and waterproof plug-in LED light string structure according to claim 1, wherein:

a pointed protrusion (2206) that penetrates into the linear groove (25) is disposed at a tail end of each of the first electrical connecting piece (2204) and the second electrical connecting piece (2205);

the two pointed protrusions (2206) are staggered with each other; and a U-shaped connecting portion (2207) is disposed at another tail end of each of the first electrical connecting piece (2204) and the second electrical connecting piece (2205).

9. The sealed and waterproof plug-in LED light string structure according to claim 1, wherein:

the end cover (4) comprises a cover plate (41), a pin (42), and a wire-pressing rib (43);

the pin (42) is inserted into and fixed to the lamp holder body (21);

the cover plate (41) abuts against the first sealing member (24); and the wire-pressing rib (43) abuts against the series-connected wire (1) in the linear groove (25).

10. The sealed and waterproof plug-in LED light string structure according to claim 1, wherein:

the first sealing member (24) is formed by dispensing an adhesive or is a special-shaped sealing ring; and the first sealing member (24) protrudes beyond the annular sealing groove (23) so as to cooperate with the end cover (4) to form sealing.

11. The sealed and waterproof plug-in LED light string structure according to claim 1, wherein the first electrical connecting piece (2204), the second electrical connecting piece (2205), and the lamp holder body (21) are integrally formed via an insert member.

* * * * *